United States Patent
Nakashima et al.

(10) Patent No.: US 10,315,396 B2
(45) Date of Patent: Jun. 11, 2019

(54) SHEET FOR IMAGE DISPLAY UNIT, LAMINATE FOR IMAGE DISPLAY UNIT, AND IMAGE DISPLAY UNIT

(71) Applicant: KEIWA INC., Osaka-shi, Osaka (JP)

(72) Inventors: Hironori Nakashima, Osaka (JP); Akira Furuta, Osaka (JP)

(73) Assignee: Keiwa Inc., Osaka (JP)

( * ) Notice: Subject to any disclaimer, the term of this patent is extended or adjusted under 35 U.S.C. 154(b) by 205 days.

(21) Appl. No.: 15/316,035

(22) PCT Filed: Jun. 4, 2015

(86) PCT No.: PCT/JP2015/066265
§ 371 (c)(1),
(2) Date: Feb. 21, 2017

(87) PCT Pub. No.: WO2015/186810
PCT Pub. Date: Dec. 10, 2015

(65) Prior Publication Data
US 2017/0182753 A1  Jun. 29, 2017

(30) Foreign Application Priority Data
Jun. 4, 2014 (JP) .................. 2014-116238

(51) Int. Cl.
*B32B 27/32* (2006.01)
*B32B 27/00* (2006.01)
(Continued)

(52) U.S. Cl.
CPC .............. *B32B 27/325* (2013.01); *B32B 3/30* (2013.01); *B32B 7/12* (2013.01); *B32B 27/00* (2013.01);
(Continued)

(58) Field of Classification Search
CPC .......... B32B 27/325; B32B 27/06; B32B 3/30; B32B 7/12; B32B 2255/10;
(Continued)

(56) References Cited

U.S. PATENT DOCUMENTS

| 6,090,888 A | 7/2000 | Khanarian et al. |
| 2006/0036033 A1 | 2/2006 | Toyoshima et al. |

(Continued)

FOREIGN PATENT DOCUMENTS

| EP | 1548063 A1 | 6/2005 |
| JP | 7-238190 A | 9/1995 |

(Continued)

OTHER PUBLICATIONS

Office Action dated Sep. 14, 2018 of corresponding European Patent Application No. 15802893.6.

*Primary Examiner* — Ruiyun Zhang
(74) *Attorney, Agent, or Firm* — Norris McLaughlin (57) ABSTRACT

A sheet for an image display unit to be provided on the front face side of an image display unit includes a substrate layer containing a cycloolefin copolymer as a principal component and an elastomer having a refractive index substantially equal to the refractive index of the cycloolefin copolymer, in an amount of no less than 2 parts by mass and no greater than 7 parts by mass with respect to 100 parts by mass of the cycloolefin copolymer. The substrate layer preferably has an average thickness of no less than 100 μm and no greater than 500 μm, a water absorbing rate preferably no greater than 0.5%, a tensile strength of preferably no less than 40 MPa and no greater than 70 MPa, and a tensile elongation in a longitudinal direction at 25° C. is preferably no less than 4% and no greater than 15%.

14 Claims, 4 Drawing Sheets

(51) Int. Cl.
*B32B 3/30* (2006.01)
*B32B 7/12* (2006.01)
*B32B 27/06* (2006.01)
*G02F 1/1335* (2006.01)
*C09J 7/24* (2018.01)
*G02F 1/1333* (2006.01)

(52) U.S. Cl.
CPC .............. *B32B 27/06* (2013.01); *C09J 7/241* (2018.01); *G02F 1/133308* (2013.01); *G02F 1/133502* (2013.01); *B32B 2255/10* (2013.01); *B32B 2270/00* (2013.01); *B32B 2307/408* (2013.01); *B32B 2307/412* (2013.01); *B32B 2307/418* (2013.01); *B32B 2307/54* (2013.01); *B32B 2307/7246* (2013.01); *B32B 2457/202* (2013.01); *C09J 2201/606* (2013.01); *C09J 2201/622* (2013.01); *C09J 2203/318* (2013.01); *C09J 2421/00* (2013.01); *C09J 2423/00* (2013.01); *G02F 2001/133331* (2013.01); *G02F 2201/501* (2013.01); *G02F 2202/022* (2013.01); *G02F 2202/28* (2013.01); *Y10T 428/10* (2015.01); *Y10T 428/1036* (2015.01); *Y10T 428/1086* (2015.01)

(58) Field of Classification Search
CPC .......... B32B 2270/00; B32B 2307/408; B32B 2307/412; B32B 2307/54; B32B 2307/7246; B32B 2457/202; G02F 1/133502; G02F 1/133504; Y10T 428/10; Y10T 428/1036; Y10T 428/1086

USPC .... 428/1.1, 1.3, 1.6, 1.61; 349/95, 112, 158, 349/160; 525/97, 210, 88
See application file for complete search history.

(56) References Cited

U.S. PATENT DOCUMENTS

| | | |
|---|---|---|
| 2011/0222053 A1 | 9/2011 | Kamikawa et al. |
| 2014/0293190 A1 | 10/2014 | Nakashima |
| 2015/0259485 A1 | 9/2015 | Kunimoto |
| 2016/0187544 A1 | 6/2016 | Watanabe |
| 2016/0311987 A1 | 10/2016 | Hosoya et al. |

FOREIGN PATENT DOCUMENTS

| | | |
|---|---|---|
| JP | 2000-511582 A | 9/2000 |
| JP | 2004-156048 A | 6/2004 |
| JP | 2005-272711 A | 10/2005 |
| JP | 2007-226222 A | 9/2007 |
| JP | 2011-209695 A | 10/2011 |
| JP | 2013-010836 A | 1/2013 |
| JP | 2014-194466 A | 10/2014 |
| JP | 2015-037861 A | 2/2015 |
| JP | 2015-055796 A | 3/2015 |
| WO | 2004/035688 A1 | 4/2004 |
| WO | 2013/179781 A1 | 12/2013 |
| WO | 2014/034200 A1 | 3/2014 |
| WO | 2015/083808 A1 | 11/2015 |

SHEET FOR IMAGE DISPLAY UNIT, LAMINATE FOR IMAGE DISPLAY UNIT, AND IMAGE DISPLAY UNIT

BACKGROUND OF THE INVENTION

The present invention relates to a sheet for an image display unit, a laminate for an image display unit, and an image display unit.

Conventionally, a image display unit such as a liquid crystal display devices, plasma display and organic EL display is provided with a glass front face plate on a front face side thereof (see Japanese Unexamined Patent Application, Publication No. 2011-209695). The front face plate is provided for the purpose of e.g., increasing the strength of the front face side of the image display unit.

On the other hand, as the image display unit nowadays, in order to enhance realistic sensation, for example, a curved screen display has been also proposed that is curved toward a viewer side from the middle portion over both sides along horizontal directions such that distances between the viewer and the display become substantially the same for the middle portion and the peripheral portion of the display.

However, according to conventional glass front face plates, it is difficult to deform to give a desired curved-face shape after manufacturing, and further, it is necessary to heat at a fixed temperature for deforming to give a certain curved-face shape. Therefore, formability and operation efficiency may be inferior, and the heat may lead to deterioration of the quality of liquid crystal cell and the like upon heating. Also, a process of production of such a glass front face plate beforehand to meet a curved-face shape of a liquid crystal panel may be an alternative; however, in this case, it is necessary to prepare the product for every standard (curved-face shape) with respect to each liquid crystal panel. In addition, the glass front face plate produced to have such a curved-face shape beforehand is also disadvantageous in an increase of storage spaces.

Still further, use of a front face film made from a synthetic resin, in place of the conventional glass front face plate may be also envisaged. However, such a front face film made from a synthetic resin is, for example, in a case where a front face film formed from an acrylic resin is employed for enhancing the strength of the front face side, disadvantageous in that it is likely to be broken when curved to have a curved-face shape. Further, in a case where a front face film formed from a polycarbonate resin resin is employed, it may be disadvantageous in that because of high photoelastic coefficient, retardation is likely to occur upon thermal load applied thereto, whereby visibility may be affected.

SUMMARY OF THE INVENTION

The present invention was made in view of such circumstances, and an object of the present invention is to provide a sheet for an image display unit that is capable of easily and accurately conforming to a curved-face shape of a curved screen display, and is capable of preventing impairment of visibility. In addition, another object of the present invention is to provide laminate for an image display unit and image display unit that enable a suitable curved-face shape to be obtained, and to prevent visibility loss.

According to an aspect of the present invention made for solving the aforementioned problems, a sheet for an image display unit to be provided on the front face side of an image display unit is provided, the sheet comprising a flexible substrate layer comprising a cycloolefin copolymer as a principal component, wherein the substrate layer contains an elastomer having a refractive index substantially equal to a refractive index of the cycloolefin copolymer, in an amount of no less than 2 parts by mass and no greater than 7 parts by mass with respect to 100 parts by mass of the cycloolefin copolymer.

According to the sheet for an image display unit, the substrate layer contains a cycloolefin copolymer as a principal component, and also contains an elastomer having a refractive index substantially equal to the refractive index of the cycloolefin copolymer in the above ratio; therefore, while clouding phenomenon resulting from the difference in the refractive indices between the cycloolefin copolymer and the elastomer, and lowering of light transmittance based on the clouding phenomenon can be inhibited, toughness and flexibility can be improved. Thus, the sheet for an image display unit can easily and accurately conform to a curved-face shape of the curved screen display, and can be used in place of a conventional glass front face plate. In addition, since the substrate layer contains as a principal component a cycloolefin copolymer having a low photoelastic coefficient in the sheet for an image display unit, even if thermal load is applied, occurrence of retardation is inhibited, and thus visibility loss can be prevented. Furthermore, since the substrate layer contains the cycloolefin copolymer as a principal component in the sheet for an image display unit, the water absorbing property can be kept at a low level, leading to an improvement of moisture resistance of the substrate layer, whereby a dimensional change resulting from bowing, deflection and the like can be prevented.

An average thickness of the substrate layer is preferably no less than 100 μm and no greater than 500 μm. When the average thickness of the substrate layer thus falls within the above range, strength and flexibility can be suitably improved.

A water absorbing rate of the substrate layer is preferably no greater than 0.5%. When the water absorbing rate of the substrate layer thus falls within the above range, dimensional change resulting from bowing, deflection and the like can be suitably prevented.

The substrate layer has a resistance against pressure of preferably no less than 50 g as determined by a testing method comprising:

forming from the substrate layer a circularly looped test piece having a circumferential length of 3 cm and a width of 1 cm;

placing the circularly looped test piece such that a radial direction thereof coincides with a vertical direction; and measuring a mass of a weight with which breakage occurs upon dropping of the weight from a height of 20 mm above a top of the circularly looped test piece.

Accordingly, conformity of the image display unit to the curved-face shape can be improved.

A tensile strength of the substrate layer is preferably no less than 40 MPa and no greater than 70 MPa. When the tensile strength of the substrate layer thus falls within the above range, the conformity of the image display unit to the curved-face shape can be improved.

The tensile elongation of the substrate layer in a longitudinal direction at 25° C. is preferably no less than 4% and no greater than 15%. When the tensile elongation of the substrate layer in a longitudinal direction at 25° C. thus falls within the above range, the conformity of the image display unit to the curved-face shape can be improved.

A haze value of the substrate layer is preferably no greater than 3%. When the haze value of the substrate layer thus falls within the above range, visibility loss of the image displayed by the image display unit is inhibited, and sharpness of the image displayed can be maintained.

It is preferred that the substrate layer has a sea-island structure that includes a matrix phase containing the cycloolefin copolymer as a main polymer, and a plurality of dispersed phases containing the elastomer as a main polymer. By virtue of the substrate layer thus having a sea-island structure that includes a matrix phase containing the cycloolefin copolymer as a main polymer, and a plurality of dispersed phases containing the elastomer as a main polymer, toughness, the conformity of the image display unit to the curved-face shape, and the like can be improved.

It is preferred that at least a part of the dispersed phases are each in an elongated particulate form having a maximum diameter oriented along one direction on a plane of the sheet, wherein a maximum width along another direction on the plane which is perpendicular to the one direction of the maximum diameter is greater than a maximum thickness. By virtue of thus at least a part of the dispersed phases being each in an elongated particulate form having a maximum diameter oriented along one direction on a plane of the sheet, wherein a maximum width along another direction on the plane which is perpendicular to the one direction of the maximum diameter is greater than a maximum thickness, the sheet for an image display unit can be more easily curved toward a single direction side.

It is preferred that the number of the dispersed phases each in the elongated particulate form, with respect to the number of the plurality of dispersed phases is no less than $1/10$. When the number of the dispersed phases each in the elongated particulate form, with respect to the number of the plurality of dispersed phases is thus no less than the lower limit, easier curving of the sheet for an image display unit toward the one direction side is facilitated, and in the case where the sheet for an image display unit is curved toward a one direction side, generation of wrinkle, crack and the like can be easily and accurately prevented.

It is preferred that the substrate layer comprises on at least one face a wavy fine modulated structure, and ridges of the wavy fine modulated structure are aligned along an orientation direction of the maximum diameter of the dispersed phases each in the elongated particulate form. By virtue of thus the substrate layer comprising on at least one face a wavy fine modulated structure, and ridges of the wavy fine modulated structure being aligned along an orientation direction of the maximum diameter of the dispersed phases each in the elongated particulate form, the sheet for an image display unit can be more easily curved also to a direction perpendicular to the one direction side described above.

A moisture permeability of the substrate layer is preferably no greater than 1 g/m$^2$·24 h. When the moisture permeability of the substrate layer thus falls within the above range, dimensional change resulting from bowing, deflection and the like can be suitably prevented.

It is preferred that an antireflection layer laminated on a front face side of the substrate layer is further included. When thus an antireflection layer laminated on a front face side of the substrate layer is further included, reflection of light from outside can be prevented to enable deterioration of the quality of a displayed image to be inhibited.

It is preferred that a transparent tacky material layer laminated on a back face side of the substrate layer is further included. Since the substrate layer is superior in moisture resistance as described above, by virtue of laminating a transparent tacky material layer on the back face side of the substrate layer, while preventing occurrence of bowing, deflection and the like resulting from the lamination of the tacky material layer, the tacky material layer enables to be easily and accurately attached to an image display unit and the like.

It is preferred that a release sheet laminated on a back face of the tacky material layer is further included. By virtue of thus comprising a release sheet laminated on a back face of the tacky material layer, easiness of handling of the sheet for an image display unit can be improved.

In addition, a laminate for an image display unit according to another aspect of the present invention made for solving the aforementioned problems comprises the sheet for an image display unit of the above aspect, and a liquid crystal panel on a front face of which the sheet for an image display unit is adhered to be laminated via the tacky material layer.

By virtue of the sheet for an image display unit of the above aspect laminated on a front face of the liquid crystal panel via the tacky material layer, the laminate for an image display unit of this aspect enables a suitable curved-face shape to be attained.

In addition, an image display unit according to other aspect of the present invention made for solving the aforementioned problems comprises the sheet for an image display unit of the above aspect of the invention.

By virtue of comprising the sheet for an image display unit, the image display unit enables a suitable curved-face shape to be attained.

It is to be noted that the term "principal component" as referred to herein means a component included at the greatest content, and for example, a component included at a content of no less than 50% by mass, preferably no less than 80% by mass, and more preferably no less than 90% by mass. The term "refractive index" as referred to means an average value of refractive indices to a d-ray (wavelength: 587.6 nm), as measured by using a plate-like test piece having each edge of 70 mm and a thickness of 2 mm, at a temperature of 23° C., with three times of the test. In addition, the phrase "an elastomer having a refractive index substantially equal to a refractive index of the cycloolefin copolymer" as referred to means that a ratio of the refractive index of the cycloolefin copolymer to the refractive index of the elastomer is no less than 0.9 and no greater than 1.1, preferably no less than 0.95 and no greater than 1.05, more preferably no less than 0.98 and no greater than 1.02. The term "main polymer" as referred to means a polymer included at a greatest content, and, for example, a polymer included at a content of no less than 50% by mass. The term "front face side" as referred to means a display surface side of an image display unit, and the term "back face side" as referred to means the opposite side thereto. The term "water absorbing rate" as referred to means a percentage value obtained by: measuring a mass $m_1$ of a test piece immediately after initial drying, and a mass $m_2$ of the test piece immediately after immersing in water, in accordance with "A method" of JIS-K-7209: 2000 "Plastics—Determination of water absorption"; and then dividing the difference between the mass $m_2$ and the mass $m_1$ by the mass $m_1$. The "tensile strength" and "tensile elongation" as referred to means values determined in accordance with JIS-K-7161: 1994. The "haze value" as referred to means a value determined in accordance with JIS-K-7136: 2000. The "moisture permeability" is a value of mass (g) of water vapor that passes through a sample in an area of 1 m$^2$ in an atmosphere at a temperature of 40° C. and a humidity of 92% RH for 24 hrs, determined in accordance with JIS-Z-0208, "Testing methods for determination of the water vapor transmission rate" (dish method). The term "liquid crystal panel" as referred to means a panel in which a sealed space formed between two facing substrates is filled with liquid crystals, and includes, for example, a structure that includes polarizing plates each laminated on the external surface of each substrate.

As described in the foregoing, the sheet for an image display unit according to the aspect of the present invention is capable of easily and accurately conforming to a curved-face shape of a curved screen display, and is capable of inhibiting visibility loss. In addition, the laminate for an image display unit and the image display unit of according to the other aspects of the present invention enable a suitable curved-face shape to be attained.

DETAILED DESCRIPTION OF THE INVENTION

Hereinafter, embodiments of the present invention will be described in detail with appropriate references to the drawings.

First Embodiment
Sheet for Image Display Unit

Figure 1:
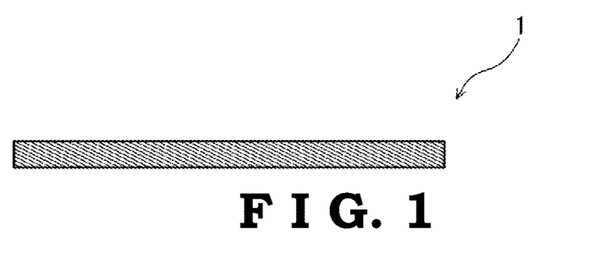
FIG. 1 shows a schematic cross sectional view illustrating a sheet for an image display unit according to a first embodiment of the present invention.

A sheet for an image display unit shown in FIG. 1 is provided on the front face side of the image display unit, specifically, provided on the front face side of a curved screen display, having the front face side of the liquid crystal panel being curved. The sheet for an image display unit is flexible. The sheet for an image display unit is formed as a monolayer structural body including only the substrate layer 1. It is to be noted that the term "flexibility/flexible" as referred to herein means a feature of not having generation of any crack being observed by a visual inspection when a test piece having a width of 10 cm and a length of 20 cm is wound around a round bar having a diameter of 5 cm, along a length direction, and preferably when the test piece is wound around a round bar having a diameter of 3 cm.

The substrate layer 1 contains as a principal component a cycloolefin copolymer. Since it is necessary to transmit rays of light, the substrate layer 1 is formed to be transparent, particularly colorless and transparent.

The cycloolefin copolymer for use in the substrate layer 1 as referred to means a noncrystalline cyclic olefin resin that is a copolymer of a cyclic olefin with an acyclic olefin such as ethylene. The cyclic olefin may be either a polycyclic cyclic olefin or a monocyclic cyclic olefin. Examples of the polycyclic cyclic olefin include norbornene, methylnorbornene, dimethyl norbornene, ethylnorbornene, ethylidenenorbornene, butylnorbornene, dicyclopentadiene, dihydrodicyclopentadiene, methyldicyclopentadiene, dimethyldicyclopentadiene, tetracyclododecene, methyltetracyclododecene, dimethylcyclotetradodecene, tricyclopentadiene, tetracyclopentadiene, and the like. In addition, examples of the monocyclic cyclic olefin include cyclobutene, cyclopentene, cyclooctene, cyclooctadiene, cyclooctatriene, cyclododecatriene, and the like.

The lower limit of a repeating unit derived from the cyclic olefin monomer included in a cycloolefin copolymer is preferably 50 mol %, more preferably 52 mol %, and still more preferably 54 mol %. On the other hand, the upper limit of the repeating unit derived from the cyclic olefin monomer included in a cycloolefin copolymer is preferably 80 mol %, more preferably 75 mol %, and still more preferably 70 mol %. When the repeating unit derived from the cyclic olefin monomer is less than the lower limit, heat resistance may not be sufficiently attained. To the contrary, when the repeating unit derived from the cyclic olefin monomer is greater than the upper limit, the temperature in processing is elevated, and thus coloring is more likely to occur in molding processing.

The lower limit of a proportion of the repeating unit derived from the cyclic olefin monomer being present as a dimer in the cyclic olefin monomer is preferably 30 mol %, more preferably 35 mol %, and still more preferably 40 mol %. Further, the lower limit of a proportion of the repeating unit derived from the cyclic olefin monomer being present as a trimer in the cyclic olefin monomer is preferably 15 mol %, more preferably 17 mol %, and still more preferably 20 mol %. When the proportions of the repeating units derived from the cyclic olefin monomers being present as a dimer and being present as a trimer, respectively, with respect to the content of the cyclic olefin monomer are out of the above range, physical properties may be deteriorated in cases where the glass transition temperature is comparatively high.

The cycloolefin copolymer may include a repeating unit derived from other monomer component that is copolymerizable with the cyclic olefin monomer and the acyclic olefin monomer. The upper limit of the content of the repeating unit derived from such other monomer component is preferably 10 mol %, more preferably 5 mol %, and still more preferably 3 mol %. When the content of the repeating unit derived from the other monomer component is greater than the upper limit, heat resistance and the like may be impaired.

The lower limit of a glass transition temperature of the cycloolefin copolymer is preferably 110° C., more preferably 120° C., and still more preferably 130° C. On the other hand, the upper limit of the glass transition temperature of the cycloolefin copolymer is preferably 190° C., more preferably 185° C., and still more preferably 180° C. When the glass transition temperature of the cycloolefin copolymer is less than the lower limit, the heat resistance may not be sufficiently attained. To the contrary, when the glass transition temperature of the cycloolefin copolymer is greater than the upper limit, toughness of the substrate layer 1 may be lowered. It is to be noted that the glass transition temperature as referred to means a value obtained by sealing a test piece in an aluminum pan, and measuring in a nitrogen atmosphere, at a sweep speed of 10° C./min by using "EXSTAR 6200" manufactured by Seiko Instruments Inc.

As a production method of the cycloolefin copolymer, a conventionally well-known method may be used. A typical production method of the cycloolefin copolymer includes, for example: introducing the cyclic olefin monomer and the acyclic olefin monomer into a reactor; adding a solution or dispersion liquid of a catalyst system; and allowing for a reaction at a predetermined reaction temperature. Also, the proportion of the repeating unit derived from the monomer in the cycloolefin copolymer obtained by such a method, and the like may be regulated by optimizing the reaction temperature and pressure.

As the catalyst for use in the production of the cycloolefin copolymer, a complex catalyst system including a metallocene catalyst and methyl aluminoxane as a catalytic promoter may be suitably used. Examples of the metallocene catalyst include racemic ethylidene-bis(indenyl)zirconium dichloride, racemic isopropylidene-bis(tetrahydroindenyl) zirconium dichloride, isopropylidene(1-indenyl) (3-isopropyl-cyclopentadienyl)zirconium dichloride, racemic dimethylsilyl-bis(2-methyl-benzoindenyl)zirconium dichloride, and the like.

The substrate layer 1 contains an elastomer having a refractive index substantially equal to a refractive index of the cycloolefin copolymer. The substrate layer 1 has a sea-island structure that includes a matrix phase containing the cycloolefin copolymer as a main polymer, and a plurality of dispersed phases containing the elastomer as a main polymer. By virtue of the substrate layer 1 thus having a sea-island structure that includes a matrix phase containing the cycloolefin copolymer as a main polymer, and a plurality of dispersed phases containing the elastomer as a main polymer, the sheet for an image display unit is capable of improving toughness and conformity of the image display unit to the curved-face shape.

As the elastomer, a styrene elastomer having a refractive index (ca. 1.53) that is substantially equal to the refractive index (ca. 1.53) of the cycloolefin copolymer is preferred. In addition, as the elastomer, a silicon rubber, an acrylic rubber, an ethylene-propylene rubber, a urethane rubber, a butyl rubber, a nitrile rubber, a styrene-butadiene rubber, a chloroprene rubber or the like may be also used.

The styrene elastomer is preferably a styrene copolymer, and more preferably a block copolymer having a styrene polymer block. In particular, the styrene elastomer is preferably a block copolymer having a styrene polymer block and an olefin polymer block, and a styrene-butadiene-ethylene block copolymer that is superior in compatibility with the cycloolefin copolymer is particularly preferred.

The lower limit of the styrene content in the styrene elastomer is preferably 50% by mass, more preferably 53% by mass, and still more preferably 55% by mass. On the other hand, the upper limit of the styrene content in the styrene elastomer is preferably 70% by mass, more preferably 67% by mass, and still more preferably 65% by mass. When the styrene content in the styrene elastomer is less than the lower limit, the toughness may be not be sufficiently improved. To the contrary, when the styrene content in the styrene elastomer is greater than the upper limit, the transparency may be deteriorated.

The lower limit of the content of the elastomer with respect to 100 parts by mass of the cycloolefin copolymer is 2 parts by mass, preferably 3 parts by mass, more preferably 3.5 parts by mass, and still more preferably 3.8 parts by mass. On the other hand, the upper limit of the content of the elastomer with respect to 100 parts by mass of the cycloolefin copolymer is 7 parts by mass, preferably 5.8 parts by mass, more preferably 5.6 parts by mass, and still more preferably 5.4 parts by mass. When the content of the elastomer with respect to 100 parts by mass of the cycloolefin copolymer is less than the lower limit, the toughness of the substrate layer 1 may not be sufficiently attained, and to the contrary, when the content of the elastomer with respect to 100 parts by mass of the cycloolefin copolymer is greater than the upper limit, the effect of improving the toughness may not be more achieved, and the transparency may be deteriorated.

The lower limit of the refractive index of the elastomer is preferably 1.50, more preferably 1.51, and still more preferably 1.52. On the other hand, the upper limit of the When the refractive index of the elastomer is out of the above range, the difference in the refractive indices from the refractive index of the cycloolefin copolymer that is a principal component of the substrate layer 1 becomes so great that the transparency of the substrate layer 1 may be deteriorated.

The lower limit of the weight average molecular weight (Mw) of the elastomer is preferably 25,000, and more preferably 50,000. On the other hand, the upper limit of the weight average molecular weight (Mw) of the elastomer is preferably 500,000, and more preferably 250,000. When the weight average molecular weight (Mw) is less than the lower limit, the toughness of the substrate layer 1 may not be sufficiently improved. To the contrary, when the weight average molecular weight (Mw) is greater than the upper limit, the formability may be deteriorated.

The lower limit of the number average molecular weight (Mn) of the elastomer is preferably 25,000, and more preferably 50,000. On the other hand, the upper limit of the number average molecular weight (Mn) of the elastomer is preferably 500,000, and more preferably 250,000. When the number average molecular weight (Mn) is less than the lower limit, the toughness of the substrate layer 1 may not be sufficiently improved. To the contrary, when the number average molecular weight (Mn) is greater than the upper limit, the formability may be deteriorated.

As measured by gel permeation chromatography, the upper limit of a ratio (Mw/Mn) of the polystyrene equivalent weight average molecular weight to the number average molecular weight of the elastomer is preferably 2, more preferably 1.5, and still more preferably 1.2. When the ratio (Mw/Mn) of the weight average molecular weight to the number average molecular weight is greater than the upper limit, light transmittance may be insufficient. On the other hand, the lower limit of the ratio (Mw/Mn) of the polystyrene equivalent weight average molecular weight to the number average molecular weight of the elastomer may be, for example, 1. It is to be noted that the ratio (Mw/Mn) of the weight average molecular weight to the number average molecular weight as referred to means a value determined by using GULLIVER SYSTEM ("PU-908", "CO-965") manufactured by JASCO Corporation with a column ("Shodex K-804L, K805L" manufactured by Showa Denko K.K.), and using as a detector "830-RI" manufactured by JASCO Corporation, at a column temperature of 40° C., with: chloroform (HPLC grade) as a solvent; a sample concentration of 0.1% by mass; and the amount of injected sample of 100 μL.

It is preferred that at least a part of the dispersed phases are each in an elongated particulate form having a maximum diameter oriented along one direction on a plane of the sheet, wherein a maximum width along another direction on the plane which is perpendicular to the one direction of the maximum diameter is greater than a maximum thickness. By virtue of at least a part of the dispersed phases thus being each in an elongated particulate form having a maximum diameter oriented along one direction on a plane of the sheet, wherein a maximum width along another direction on the plane which is perpendicular to the one direction of the maximum diameter, being greater than a maximum thickness, the sheet for an image display unit becomes more likely to be curved toward the one direction side.

The lower limit of the maximum diameter of the dispersed phases each in the elongated particulate form is preferably 2 μm, and more preferably 3 μm. On the other hand, the upper limit of the maximum diameter of the dispersed phases each in the elongated particulate form is preferably 10 μm, and more preferably 8 μm. When the maximum diameter of the dispersed phases each in the elongated particulate form is less than the lower limit, easier curving toward the one direction side may not be sufficiently facilitated. To the contrary, when the maximum diameter of the dispersed phases each in the elongated particulate form is greater than the upper limit, due to the too large size of the dispersed phases, the transparency of the substrate layer 1 may be deteriorated.

The lower limit of the maximum width of the dispersed phases each in the elongated particulate form is preferably 0.5 μm, and more preferably 1 μm. On the other hand, the upper limit of the maximum width of the dispersed phases each in the elongated particulate form is preferably 7 μm, and more preferably 5 μm. When the maximum width of the dispersed phases each in the elongated particulate form is less than the lower limit, the toughness of the substrate layer 1 may not be sufficiently improved. To the contrary, when the maximum width of the dispersed phases each in the elongated particulate form is greater than the upper limit, due to the too large size of the dispersed phases, the transparency of the substrate layer 1 may be deteriorated.

The lower limit of the ratio of the maximum width to the maximum diameter of the dispersed phase in the elongated particulate form is preferably 1.4, more preferably 2, and still more preferably 2.5. When the ratio of the maximum width to the maximum diameter of the dispersed phase in the elongated particulate form is less than the lower limit, easier curving toward the one direction side may not be sufficiently facilitated. It is to be noted that the upper limit of the ratio of the maximum width to the maximum diameter of the dispersed phase in the elongated particulate form is not particularly limited, but may be, for example, 8.

The lower limit of the ratio of the number of the dispersed phases each in the elongated particulate form to the number of the plurality of dispersed phases is preferably 1/10, more preferably 3/20, and still more preferably 1/5. When the ratio of the number of the dispersed phases each in the elongated particulate form to the number of the plurality of dispersed phases is less than the lower limit, easier curving toward the one direction side may not be sufficiently facilitated. On the other hand, the upper limit of the ratio of the number of the dispersed phases each in the elongated particulate form to the number of the plurality of dispersed phases is not particularly limited, but may be, for example, 4/5. It is to be noted that the ratio of the number of the dispersed phases each in the elongated particulate form to the number of the plurality of dispersed phases may be determined by, for example, observing the surface of the substrate layer with a laser microscope, and measuring each number of the dispersed phases included in a regular tetragon having one edge of 10 mm.

The lower limit of the Abbe number of the substrate layer 1 for d-ray (wavelength: 587.6 nm) is preferably 45, and more preferably 50. When the Abbe number is less than the lower limit, chromatic aberration becomes so great that visibility of the image displayed by the image display unit may be impaired. On the other hand, the upper limit of the Abbe number may be, for example, 60. It is to be noted that the Abbe number means a value measured at 23° C.

The substrate layer 1 preferably contains a lubricant in order to improve smoothness, formability and the like. The lubricant is exemplified by a fatty acid ester compound having a long chain aliphatic hydrocarbon group, an amide compound having a long chain aliphatic hydrocarbon group, or a salt having a long chain aliphatic hydrocarbon group. When such a lubricant is contained, the substrate layer 1 can be prevented from generation of gel particles when molded by an extrusion molding process. In addition, such a lubricant is preferably added internally. When the lubricant is added internally, retention of the lubricant at the bottom of the extrusion apparatus can be prevented.

The lower limit of the content of the lubricant with respect to 100 parts by mass of the cycloolefin copolymer is preferably 0.01 parts by mass, more preferably 0.02 parts by mass, and still more preferably 0.03 parts by mass. On the other hand, the upper limit of the content of the lubricant with respect to 100 parts by mass of the cycloolefin copolymer is preferably 3 parts by mass, more preferably 2.5 parts by mass, and still more preferably 2 parts by mass.

Additionally, the substrate layer 1 may contain other optional component within the range not leading to impairment of as long as the transparency and desired strength are not impaired. Example of the optional component include an ultraviolet ray-absorbing agent, an antioxidant, a stabilizer, a processing aid, a plasticizer, an impact-resistant assistant, a retardation reducing agent, a delustering agent, an antimicrobial, a fungicide, and the like.

The lower limit of the average thickness of the substrate layer 1 is preferably 100 μm, more preferably 110 μm, and still more preferably 120 μm. On the other hand, the upper limit of the average thickness of the substrate layer 1 is preferably is preferably 500 μm, more preferably 300 μm, still more preferably 250 μm, and particularly preferably 200 μm. When the average thickness of the substrate layer 1 is less than the lower limit, sufficient strength may be not be attained. To the contrary, when the average thickness of the substrate layer 1 is greater than the upper limit, the flexibility may be impaired. It is to be noted that for improving the flexibility of the sheet for an image display unit, the average thickness of the substrate layer 1 is more preferably no greater than 300 μm.

The lower limit of the surface area of the substrate layer 1 is preferably 0.5 $m^2$, more preferably 0.6 $m^2$, and still more preferably 0.7 $m^2$. To the contrary, the upper limit of the surface area of the substrate layer 1 is preferably 1.2 $m^2$, more preferably 1.1 $m^2$, and still more preferably 1 $m^2$. When the surface area of the substrate layer 1 is less than the lower limit, it may be difficult to meet demands for enlarging the display. To the contrary, when the surface area of the substrate layer 1 is greater than the upper limit, bowing, deflection and the like may occur.

The upper limit of the water absorbing rate of the substrate layer 1 is preferably 0.5%, more preferably 0.4%, and still more preferably 0.3%. When the water absorbing rate of the substrate layer 1 is greater than the upper limit, in such a case where a tacky material layer is laminated, for example, dimensional change resulting from bowing, deflection and the like may occur. It is to be noted that the lower limit of the water absorbing rate of the substrate layer 1 is not particularly limited, but may be, for example, 0.005%.

The lower limit of the mass of a weight that causes breakage in the test including: forming from the substrate layer 1 a circularly looped test piece having a circumferential length of 3 cm and a width of 1 cm; placing the circularly looped test piece such that a radial direction thereof coincides with a vertical direction; and dropping the weight from a height of 20 mm above the top of the circularly looped test piece is preferably 50 g, more preferably 100 g, and still more preferably 150 g. When the mass of the weight is less than the lower limit, the conformity of the image display unit to the curved-face shape may not be sufficiently attained. It is to be noted that the upper limit of the mass of the weight is not particularly limited, but may be, for example, 500 g. When the mass of the weight is greater than the upper limit, handleability may be impaired.

The lower limit of the tensile strength of the substrate layer 1 is preferably 40 MPa, more preferably 45 MPa, and still more preferably 50 MPa. On the other hand, the upper limit of the tensile strength of the substrate layer 1 is preferably 70 MPa, more preferably 65 MPa, and still more preferably 60 MPa. When the tensile strength of the substrate layer 1 is less than the lower limit, breakage, wrinkle and the like may be generated. To the contrary, when the tensile strength of the substrate layer 1 is greater than the upper limit, obtaining sufficient ductility may fail, whereby the conformity of the image display unit to the curved-face shape may be impaired.

The lower limit of the tensile elongation along the longitudinal direction of the substrate layer 1 at 25° C. is preferably 4%, more preferably 5%, and still more preferably 7%. On the other hand, the upper limit of the tensile elongation along the longitudinal direction of the substrate layer 1 at 25° C. is preferably 15%, more preferably 14%, and still more preferably 12%. When the tensile elongation along the longitudinal direction of the substrate layer 1 at 25° C. is less than the lower limit, cracks and the like are likely to be generated, and the conformity of the image display unit to the curved-face shape may be impaired. To the contrary, when tensile elongation along the longitudinal direction of the substrate layer 1 at 25° C. is greater than the upper limit, the strength may be impaired.

The upper limit of the moisture permeability of the substrate layer 1 is preferably 1 g/m$^2$·24 h, more preferably 0.8 g/m$^2$·24 h, and still more preferably 0.6 g/m$^2$·24 h. When the moisture permeability of the substrate layer 1 is greater than the upper limit, dimensional change resulting from bowing, deflection and the like may be caused. It is to be noted that the lower limit of the moisture permeability of the substrate layer 1 is not particularly limited, but may be, for example, 0.01 g/m$^2$·24 h.

The upper limit of the haze value of the substrate layer 1 is preferably 3%, and more preferably 2.5%. When the haze value of the substrate layer 1 is greater than the upper limit, visibility of the image displayed by the image display unit may be impaired. It is to be noted that the lower limit of the haze value of the substrate layer 1 is not particularly limited, but may be, for example, 0.1%.

Production Method

A production method of the substrate layer 1 may include the steps of: preparing a material for forming the substrate layer 1 by kneading a cycloolefin copolymer, elastomer, etc., to constitute the substrate layer 1; and forming the substrate layer 1 by using the material prepared in the preparation step.

In the step of forming the substrate layer, for example, a well-known process such as a solution casting process (solution flow casting process), a melt extrusion process, a calendering process or a compression molding process may be employed. Of these, the solution casting process (solution flow casting process) and the melt extrusion process are preferred. In this process, a thermoplastic resin composition which was extruded and kneaded beforehand may be used, or a synthetic resin, and other additive such as a plasticizer may be separately dissolved in a solvent to prepare each homogenous mixture and thereafter the film forming step may be carried out by the solution casting process (solution flow casting process) or the melt extrusion process.

Although the plasticizer is not particularly limited, the plasticizer preferably has a functional group that exhibits a noncovalently bonded interaction so as not to cause the haze in the substrate layer 1, or cause bleeding out of volatilization from the substrate layer 1. Although such a plasticizer is not particularly limited, a phosphoric acid ester-based plasticizer, an ester phthalate-based plasticizer, a trimellitic acid ester-based plasticizer, a pyromellitic acid-based plasticizer, a polyhydric alcohol-based plasticizer, a glycolate-based plasticizer, a citric acid ester-based plasticizer, a fatty acid ester-based plasticizer, a carboxylic acid ester-based plasticizer, a polyester-based plasticizer, and the like may be exemplified.

Examples of the solvent for use in the solution casting process (solution flow casting process) include: chlorine-based solvents such as chloroform and dichloromethane; aromatic solvents such as toluene, xylene, benzene, and a mixed solvent of these; alcohol solvents such as methanol, ethanol, isopropanol, n-butanol and 2-butanol; methylcellosolve, ethylcellosolve, butylcellosolve, dimethylformamide, dimethylsulfoxide, dioxane, cyclohexanone, tetrahydrofuran, acetone, methylethylketone (MEK), ethyl acetate, diethyl ether; and the like. These solvents may be used either alone, or two or more types thereof may be used in combination. Examples of the apparatus for carrying out the solution casting process (solution flow casting process) include a drum type casting machine, a band type casting machine, spin coater, and the like.

The melt extrusion process may be exemplified by a T die process, an inflation process, and the like. In the melt extrusion, the lower limit of the molding temperature of the film is preferably 150° C., more preferably 170° C., and still more preferably 200° C. On the other hand, the upper limit of the molding temperature of the film in the melt extrusion is preferably 350° C., more preferably 330° C., and still more preferably 300° C. In forming the substrate layer 1 by the T die process, a rolled film can be obtained by attaching a T die to a tip portion of a well-known single screw extruder or twin screw extruder, and winding up an extruded film. In this process, it is possible to carry out a monoaxially stretching step by stretching in an extrusion direction while appropriately regulating the temperature of the roll for winding. Also, it is possible to carry out sequential biaxial stretching, simultaneous biaxial stretching or the like by way of stretching the film in a direction perpendicular to the extrusion direction.

The substrate layer 1 may be either an unstretched film or a stretched film. When the substrate layer 1 is formed as am unstretched film, the substrate layer 1 can be prevented from getting turbid. On the other hand, in the case where the substrate layer is stretched, either a monoaxially stretched film or a biaxially stretched film may be provided. When the biaxially stretched film is provided, either simultaneous biaxial stretching, or sequential biaxial stretching may be carried out. When biaxially stretched, the base film will have an improved mechanical strength. In addition, stretching renders orientation of the maximum diameters of the dispersed phases along the stretching direction easier while forming the dispersed phases to give the elongated particulate form or elongated particulate form biaxially stretched.

The lower limit of the stretching temperature in carrying out the stretching is lower than the glass transition temperature of the cycloolefin copolymer contained as the principal component by preferably −30° C., and more preferably 20° C. On the other hand, the upper limit of the stretching temperature in carrying out the stretching is higher than the glass transition temperature of the cycloolefin copolymer contained as the principal component by preferably 100° C., more preferably 80° C., and still more preferably 60° C. When the stretching temperature is below the lower limit, a sufficient draw ratio may not be obtained. To the contrary, when the stretching temperature is higher than the upper limit, the resin will flow, whereby the stretching may not be stably conducted. In these regards, when the stretching temperature falls within the aforementioned range, molecular motion of the polymer can be appropriately controlled, thereby enabling the orientation to be easily and accurately regulated.

The lower limit of the draw ratio as defined by the area ratio is preferably 1.1 times, more preferably 1.2 times, still more preferably 1.3 times, and particularly preferably 2 times. On the other hand, the upper limit of the draw ratio as defined by the area ratio is preferably 25 times, more preferably 15 times, and still more preferably 10 times. When the draw ratio as defined by the area ratio is less than the lower limit, achieving the effect of improving the toughness by way of the stretching may be unsatisfactory. To the contrary, when the draw ratio as defined by the area ratio is greater than the upper limit, the effect comparable to the increase of the draw ratio may not be exerted.

The lower limit of the stretching rate (one direction) is preferably 10%/min, and more preferably 100%/min. On the other hand, the upper limit of the stretching rate (one direction) is preferably 20,000%/min, and more preferably 10,000%/min. When the stretching rate (one direction) is less than the lower limit, a longer period of time is required for attaining a sufficient draw ratio, and thus a production cost may increase. To the contrary, when the stretching rate (one direction) is greater than the upper limit, breaking of the stretched film, and the like, may occur. Moreover, in order to stabilize the optical isotropy and/or the dynamic characteristics of the substrate layer 1, a heat treatment (annealing), etc., may be also carried out after the stretching treatment.

Benefit

According to the sheet for an image display unit, the substrate layer 1 contains a cycloolefin copolymer as a principal component, and also contains an elastomer having a refractive index equal to the refractive index of the cycloolefin copolymer in the above ratio; therefore, while clouding phenomenon resulting from the difference in the refractive indices between the cycloolefin copolymer and the elastomer, and lowering of light transmittance based on the clouding phenomenon can be inhibited, toughness and flexibility can be improved. Thus, the sheet for an image display unit can easily and accurately conform to a curved-face shape of the curved screen display, and can be used in place of a conventional glass front face plate. In addition, since the substrate layer 1 contains as a principal component a cycloolefin copolymer having a low photoelastic coefficient, even if thermal load is applied, occurrence of retardation is inhibited, and thus visibility loss can be prevented. Furthermore, since the substrate layer 1 contains the cycloolefin copolymer as a principal component, the water absorbing property can be kept at a low level, leading to an improvement of moisture resistance of the substrate layer, whereby a dimensional change resulting from bowing, deflection and the like can be prevented.

Second Embodiment

Sheet for Image Display Unit

Figure 2:
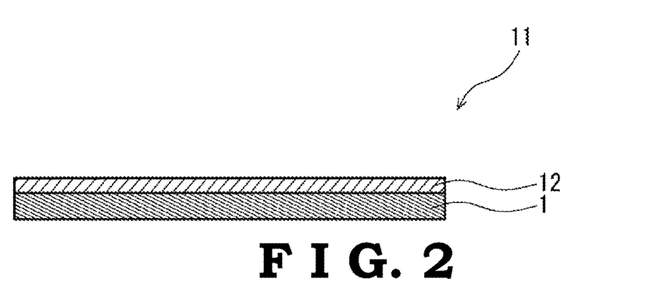
FIG. 2 shows a schematic cross sectional view illustrating a sheet for an image display unit according to an embodiment that is different from the sheet for an image display unit shown in FIG. 1.

A sheet for an image display unit 11 shown in FIG. 2 is provided on the front face side of the image display unit, specifically, provided on the front face side of a curved screen display, having the front face side of the liquid crystal panel being curved. The sheet for an image display unit 11 is flexible. The sheet for an image display unit 11 has the substrate layer 1, and a transparent tacky material layer 12 laminated on one face of the substrate layer 1. The sheet for an image display unit 11 is formed as a bilayer structural body including the substrate layer 1 and the tacky material layer 12. Since the substrate layer 1 is similar to that in the sheet for an image display unit shown in FIG. 1, the description is omitted through designating with the identical reference number.

Tacky Material Layer

The tacky material layer 12 is formed from a synthetic resin such as an acrylic resin, a polyether or a urethane resin, as a principal component. The average thickness of the tacky material layer 12 may be, for example, no less than 5 μm and no greater than 50 μm. The tacky material layer 12 is formed by attaching, for example, an optical transparent tacky sheet (OCA: Optical Clear Adhesive) on one face of the substrate layer 1.

Benefit

In addition to the effects achieved by the sheet for an image display unit shown in FIG. 1, by virtue of having the tacky material layer 12 laminated on one face of the substrate layer 1, the sheet for an image display unit 11 can be easily and accurately attached to an image display unit or the like by means of the tacky material layer 12. Moreover, since the moisture resistance of the substrate layer 1 is improved in the sheet for an image display unit 11, permeation of the moisture to the substrate layer 1 in laminating the tacky material layer 12 on one face of the substrate layer 1 can be inhibited, and thus dimensional change resulting from bowing, deflection and the like can be suitably prevented.

Furthermore, according to the sheet for an image display unit 11, the tacky material layer 12 being the optical transparent tacky sheet enables, the haze value to be kept at a low level, and the visibility of the image displayed by the image display unit can be maintained.

Third Embodiment

Sheet for Image Display Unit

Figure 3:
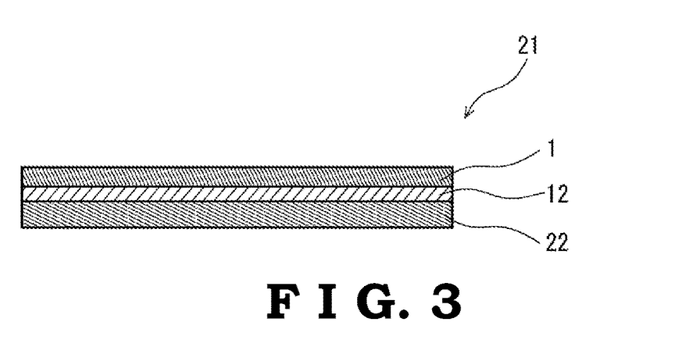
FIG. 3 shows a schematic cross sectional view illustrating a sheet for an image display unit according to an embodiment that is different from the sheet for an image display unit shown in FIGS. 1 and 2.

A sheet for an image display unit 21 shown in FIG. 3 is provided on the front face side of the image display unit, specifically, provided on the front face side of a curved screen display, having the front face side of the liquid crystal panel being curved. The sheet for an image display unit 21 is flexible. The sheet for an image display unit 21 has the substrate layer 1, and a transparent tacky material layer 12 laminated on the back face of the substrate layer 1, and a release sheet 22 laminated on the back face of the tacky material layer 12. The sheet for an image display unit 11 is formed as a three-layer structural body including the substrate layer 1, the tacky material layer 12, and the release sheet 22. Since the substrate layer 1 and the tacky material layer 12 are similar to those in the sheet for an image display unit 11 shown in FIG. 2, the description is omitted through designating with the identical reference number.

Release Sheet

Examples of the principal component for forming the release sheet 22 include synthetic resins such as polypropylene, polyethylene, polyamide, polyester, an acrylic resin and polyvinyl chloride. Also, as the release sheet 22, a metal foil such as an aluminum foil or copper foil, or a cellulose-based sheet such as a glassine paper, coated paper or cellophane may be used. Alternatively, in order to improve peelability from the tacky material layer 12, one obtained by laminating a release layer on the tacky material layer 12 side may be used as the release sheet 22. A synthetic resin which may form such a release layer is exemplified by a melamine resin, a urea resin, a polyurethane, a polyester, a phenol resin, an epoxy resin, an aminoalkyd resin, and the like. The release layer may be formed by applying a material for forming the release layer by a well-known process such as a gravure coating process, roll coating process, comma coating process or RIP coating process, followed by drying to allow for hardening. In addition, upon forming the release layer, thus laminated face may be subjected to a corona treatment or an adhesion-facilitating treatment.

The lower limit of the average thickness of the release sheet 22 is preferably 10 μm, more preferably 15 μm, and still more preferably 20 μm. When the average thickness of the release sheet 22 is less than the lower limit, peel workability of the release sheet 22 may be lowered. On the other hand, the upper limit of the average thickness of the release sheet 22 may be, for example, 100 μm.

Benefit

In addition to the effects achieved by the sheet for an image display unit 11, by virtue of having the release sheet 22 laminated on the back face of the tacky material layer 12, the sheet for an image display unit 21 can provide improved easiness of handling. In addition, after peeling the release sheet 22 off, the sheet for an image display unit 21 can be easily attached to the front face or the like of the image display unit by means of the tacky material layer 12. Therefore, the sheet for an image display unit 21 enables the workability to be significantly improved as compared with conventional glass front face plates.

Fourth Embodiment

Sheet for Image Display Unit

Figure 4:
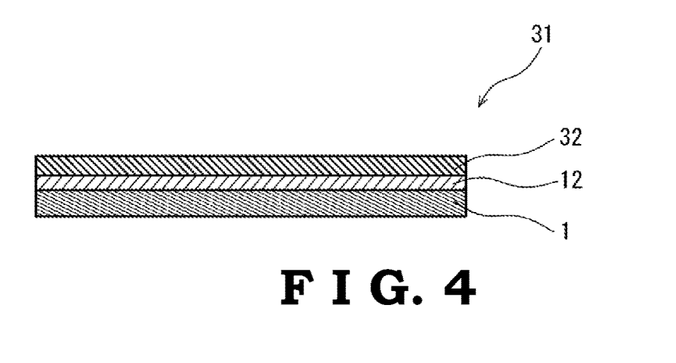
FIG. 4 shows a schematic cross sectional view illustrating a sheet for an image display unit according to an embodiment that is different from the sheet for an image display unit shown in FIGS. 1, 2 and 3.

A sheet for an image display unit 31 shown in FIG. 4 is provided on the front face side of the image display unit, specifically, provided on the front face side of a curved screen display, having the front face side of the liquid crystal panel being curved. The sheet for an image display unit 31 is flexible. The sheet for an image display unit 31 has the substrate layer 1, and a transparent tacky material layer 12 laminated on the front face of the substrate layer 1, and an antireflection layer 32 laminated on the front face of the tacky material layer 12. The sheet for an image display unit 31 is formed as a three-layer structural body including the substrate layer 1, the tacky material layer 12, and the antireflection layer 32. Since the substrate layer 1 and the tacky material layer 12 are similar to those in the sheet for an image display unit 11 shown in FIG. 2, the description is omitted through designating with the identical reference number.

Antireflection Layer

The antireflection layer 32 is not particularly limited, and may be exemplified by: an antireflection layer consisting of only a low-refractive index layer; an antireflection layer having a multilayer structure which includes a low-refractive index layer(s) and a high-refractive index layer(s) alternately laminated, having low-refractive index layer on the outermost surface side; and an antireflection layer consisting of a layer having an irregular shape formed on the surface thereof.

The low-refractive index layer may be exemplified by: a layer containing a low-refractive index substance such as silica or magnesium fluoride in a resin; a layer of a low-refractive index resin such as a fluorocarbon resin; a layer containing a low-refractive index substance in a low-refractive index resin; a layer formed from a low-refractive index substance such as silica or magnesium fluoride by a thin-film forming process such as sputtering; a layer containing void-including fine particles as the low-refractive index substance in a resin layer; and the like.

On the other hand, the high-refractive index layer layer may be exemplified by: an antireflection layer containing a high-refractive index substance such as titanium oxide, zirconium oxide or zinc oxide in a resin; a layer of a high-refractive index resin such as fluorine-free resin; a layer containing a high-refractive index substance in a high-refractive index resin; a layer formed from a high-refractive index substance such as titanium oxide, zirconium oxide or zinc oxide by a thin-film forming process such as sputtering; and the like.

Furthermore, a procedure for forming an irregular shape on the surface is exemplified by: a procedure of forming an irregular shape on a film surface by emboss processing; a procedure of forming an irregular shape by applying a coating solution prepared by mixing particles in a binder matrix-forming material, and dispersing the particles in the binder matrix; and the like.

Benefit

In addition to the effects achieved by the sheet for an image display unit 11, by virtue of having the antireflection layer 32 laminated on the front face of the tacky material layer 12, the sheet for an image display unit 31 can prevent reflection of light from outside, thereby enabling deterioration of the quality of a displayed image to be inhibited.

Fifth Embodiment

Laminate for Image Display Unit

Figure 5:
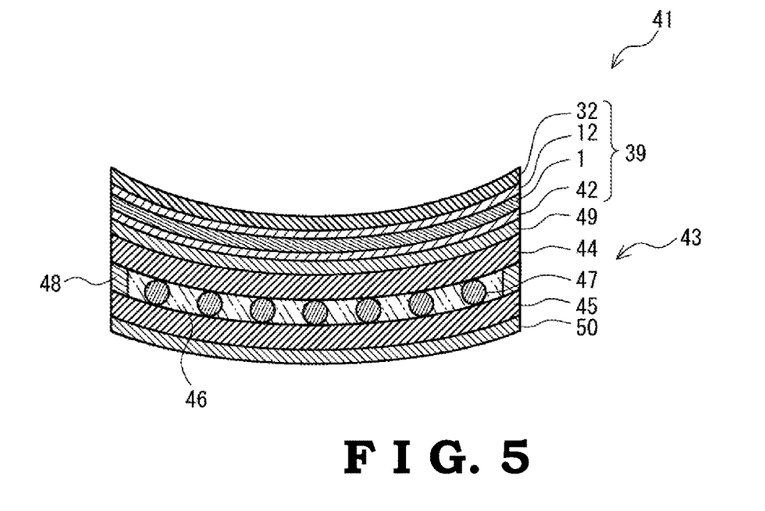
FIG. 5 shows a schematic cross sectional view illustrating a laminate for an image display unit provided with the sheet for an image display unit shown in FIG. 4.

The laminate for an image display unit 41 shown in FIG. 5 has a sheet for an image display unit 39, and a liquid crystal panel 43 on the front face of which the sheet for an image display unit 39 is adhered to be laminated via a tacky material layer 42. The sheet for an image display unit 39 has a structure in which the transparent tacky material layer 42 is laminated on the back face of the sheet for an image display unit 31 shown in FIG. 4. The tacky material layer 42 of the sheet for an image display unit 39 may have a similar constitution to that of the tacky material layer 12 shown in FIG. 2.

Liquid Crystal Panel

The liquid crystal panel 43 has: a pair of glass substrates 44, 45; liquid crystals 46 included between the pair of glass substrates 44, 45; a plurality of spacers 47 for maintaining an interval between the pair of glass substrates 44, 45; a sealing material 48 for sealing the liquid crystals 46; and a pair of polarizing plates 49, 50 laminated on the front face side of the glass substrate 44, and on the back face side of glass substrate 45. In the liquid crystal panel 43, the front face side is formed with curving, more specifically, formed so as to be curved toward the front face side from the middle portion over both sides along a horizontal direction. The curvature radius of the curved face of the liquid crystal panel 43 is not particularly limited, and for example, may be no less than 6 m and no greater than 8 m.

The liquid crystal panel 43 may be formed by, for example: mating a pair of glass substrates 44, 45 into a bending die; heating at a temperature no lower than the glass transition temperature; bending the pair of glass substrates 44, 45 so as to have a curved shape toward the front face side from the middle portion over both sides.

The laminate for an image display unit 41 is produced by, for example, attaching the liquid crystal panel 43 on the back face of the tacky material layer 42 of the sheet for an image display unit 39.

Benefit

Since the sheet for an image display unit 39 is laminated on the front face of the liquid crystal panel 43 via the tacky material layer 42 in the laminate for an image display unit 41, a suitable curved-face shape can be obtained.

Sixth Embodiment

Image Display Unit

Figure 6:
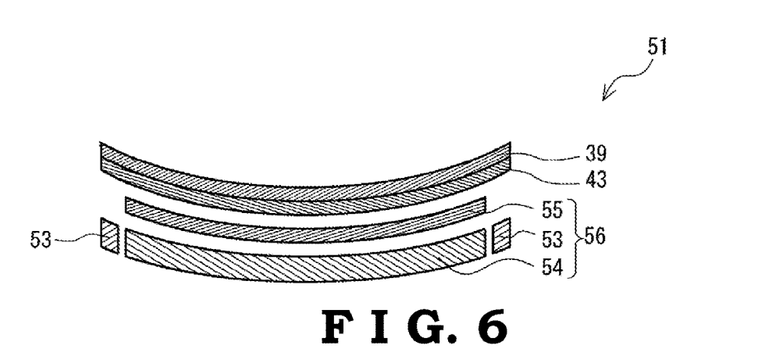
FIG. 6 shows a schematic cross sectional view illustrating an image display unit provided with the laminate for an image display unit shown in FIG. 5.

The image display unit 51 shown in FIG. 6 is provided with the sheet for an image display unit 39. In addition, the image display unit 51 includes the liquid crystal panel 43, and a backlight unit 56 provided on the back face side of the liquid crystal panel 43. Since the liquid crystal panel 43 is similar to the liquid crystal panel 43 shown in FIG. 5, the description is omitted through designating with the identical reference number.

Backlight Unit

The backlight unit 56 has an optical waveguide plate 54, light sources 53 provided along a pair of opposing end faces of the optical waveguide plate 54, and one or a plurality of optical sheet(s) 55 provided on the front face side of the optical waveguide plate 54. The light source 53 is exemplified by a plurality of LEDs, cold-cathode tubes, and the like. Furthermore, the optical sheet 55 is exemplified by a light diffusion sheet, a micro lens sheet, a prism sheet and the like, which may be superposed in combination as needed.

Benefit

Since the image display unit 51 is provided with the sheet for an image display unit 39, a suitable curved-face shape can be obtained.

Other Embodiments

It is to be noted that in addition to the foregoing embodiments, the sheet for an image display unit, the laminate for an image display unit and the image display unit of the present invention can be put into practice with modes having been variously modified, improved, etc. For example, the sheet for an image display unit and laminate for an image display unit is not necessarily for a curved screen display, and may be suitably used for a display having a display surface formed to be flat. In addition, the image display unit may not necessarily be a curved screen display, and a flat panel display having a display surface formed to be flat may be employed. Furthermore, also in the case where the image display unit is a curved screen display, the curved shape of this curved screen display is not particularly limited, and for example, a shape curved from the middle portion over the front face side or the back face side along the vertical direction may be employed. The sheet for an image display unit may have other layer between the substrate layer and the tacky material layer, or between the tacky material layer and the antireflection layer. Also, the sheet for an image display unit may have other function layer in place with or in addition to the antireflection layer. The other function layer provided in the sheet for an image display unit is exemplified by a coating layer, an anti-fingerprinting layer, an anti-staining layer, and the like. Furthermore, the sheet for an image display unit is not necessarily provided with the antireflection layer separately from the substrate layer, and for example, a reflection preventive function may be imparted to the substrate layer by forming irregularities on the front face of the substrate layer.

The sheet for an image display unit is not limited to the structure described above, and for example, a structure shown in FIG. 7 can be also adopted. Hereinafter, the sheet for an image display unit shown in FIG. 7 will be described in detail.

Sheet for Image Display Unit

Figure 7:
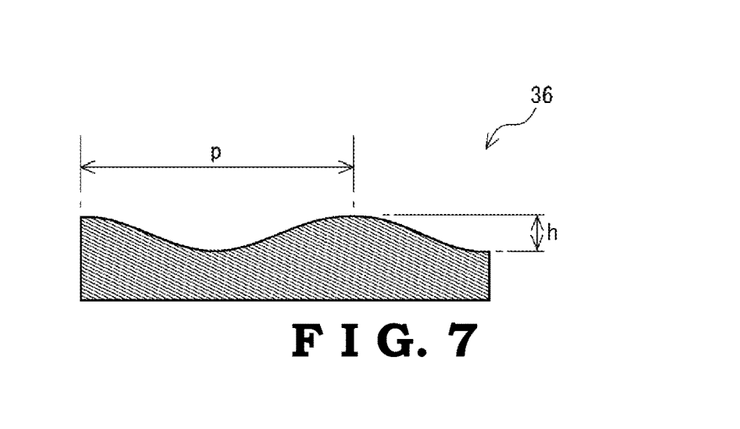
FIG. 7 shows a schematic cross sectional view illustrating a sheet for an image display unit according to an embodiment that is different from the sheet for an image display unit shown in FIGS. 1 to 4.

The sheet for an image display unit shown in FIG. 7 is formed as a monolayer structural body including only a substrate layer 36. The substrate layer 36 is formed from a forming material similar to that of the substrate layer 1 shown in FIG. 1. The substrate layer 36 has on at least one face a wavy fine modulated structure in which ridges are formed along an orientation direction of the maximum diameter of the dispersed phases each in the elongated particulate form. The substrate layer 36 is similarly constituted to the substrate layer 1 of the sheet for an image display unit shown in FIG. 1 except for having such a fine modulated structure.

The lower limit of the spacing p between ridge lines in the fine modulated structure is preferably 1 mm, more preferably 10 mm, and still more preferably 20 mm. On the other hand, the upper limit of the spacing p between ridge lines in the fine modulated structure is preferably 500 mm, more preferably 100 mm, and still more preferably 60 mm. When the spacing p between ridge lines is less than the lower limit, rays of light are condensed or diffused due to the fine modulated structure, and therefore visibility of the image displayed by the image display unit may be deteriorated. To the contrary, in a case where the spacing p between ridge lines is greater than the upper limit, curving of the sheet for an image display unit toward the direction perpendicular to the one direction side may not be sufficiently facilitated. It is to be noted that all the spacings p between ridge lines in the fine modulated structure preferably fall within the above range; however, a part of a plurality of spacings p between ridge lines in the fine modulated structure may not fall within the above range, and in this instance, it is preferred that no less than 50%, and preferably no less than 70% spacings between ridge lines among the plurality of spacings between ridge lines fall within the above range.

Additionally, the lower limit of the average height h of the ridge lines based on an approximate virtual face spread along a plurality of valley lines in the fine modulated structure is preferably 5 μm, more preferably 7 μm, and still more preferably 9 μm. On the other hand, the upper limit of the average height h of the ridge lines based on the approximate virtual face spread along a plurality of valley lines in the fine modulated structure is preferably 40 μm, more preferably 20 μm, and still more preferably 15 μm. When the average height h is less than the lower limit, curving of the sheet for an image display unit to the direction perpendicular to the one direction side may not be sufficiently facilitated. To the contrary, when the average height h is greater than the upper limit, the rays of light are condensed or diffused due to the fine modulated structure, and therefore visibility of the image displayed by the image display unit may be deteriorated.

Production Method

Next, a production method of the sheet for an image display unit shown in FIG. 7 will be described. The production method of the sheet for an image display unit includes the step of forming the substrate layer 36 by an extrusion molding process.

Substrate Layer-Forming Step

In the substrate layer-forming step, a die with a lip opening having a certain cross-sectional shape is used. In other words, by using the lip opening having a cross-sectional shape that matches the reversal shape of the fine modulated structure, the wavy and fine modulated structure is formed on at least one face side of the substrate layer 36. It is to be noted that the substrate layer 36 may be either an unstretched film or a stretched film similarly to the substrate layer 1 shown in FIG. 1, and the stretched film is preferred.

Benefit

By virtue of the substrate layer 36 having on at least one face a wavy fine modulated structure in which ridges are formed along an orientation direction of the maximum diameter of the dispersed phases each in the elongated particulate form, the sheet for an image display unit can be more easily curved also in the direction perpendicular to the one direction side.

The laminate for an image display unit or the sheet for an image display unit used in the image display unit may be any one according to the first to fourth embodiments, as well as of any sheet for an image display unit of other embodiments. Also, any one obtained by laminating other layer on the sheet for an image display unit of any of these embodiments may be also used.

Figure 8:
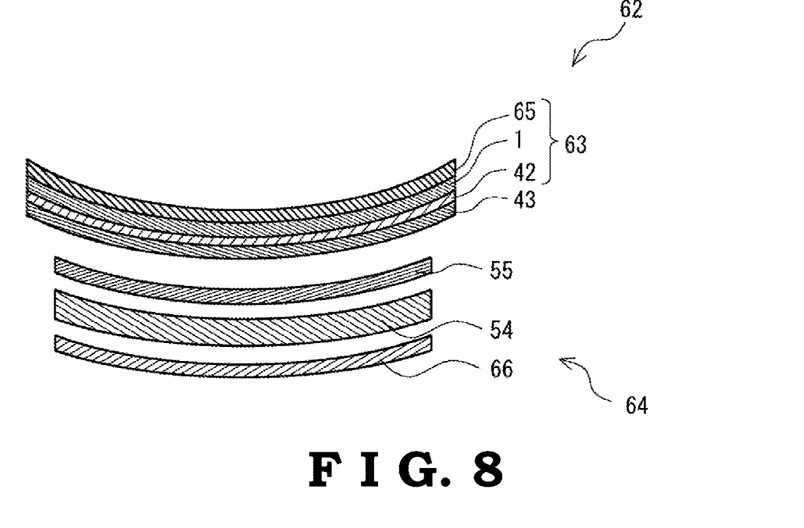
FIG. 8 shows a schematic cross sectional view illustrating an image display unit according to an embodiment that is different from the image display unit shown in FIG. 6.

The image display unit is not necessarily provided with the edge-lit backlight unit, and for example, a direct-lit backlight unit may be provided. An image display unit having been provided with such a direct-lit backlight unit is illustrated in FIG. 8. The image display unit 62 shown in FIG. 8 has: a sheet for an image display unit 63, the liquid crystal panel 43 on the front face of which the sheet for an image display unit 63 is adhered to be laminated via the tacky material layer 42; and a backlight unit 64 provided on the back face side of the liquid crystal panel 43. The sheet for an image display unit 63 shown in FIG. 8 is formed as a three-layer structure including the substrate layer 1, an antireflection layer 65 laminated on the front face of the substrate layer 1 by direct coating, and the tacky material layer 42 laminated on the back face of the substrate layer 1. Moreover, the backlight unit 64 has the optical waveguide plate 54, one or a plurality of optical sheet(s) 55 provided on the front face side of the optical waveguide plate, and a light source 66 provided on the back face side of the optical waveguide plate 54. The image display unit can have a suitable curved-face shape also with such a structure.

The edge light type backlight unit for use in the image display unit may be a one-side edge-lit backlight unit, etc., provided with a light source along only one end face of the optical waveguide plate. Furthermore, the image display unit may not necessarily be a liquid crystal display device, and a flat panel display such as a plasma display or an organic EL display may be adopted.

EXAMPLES

Hereinafter, the present invention will be described in detail with reference to Examples, but the present invention should not be construed as limited to the description of these Examples.

Example 1

A substrate layer-forming material containing 100 parts by mass of a cycloolefin copolymer having a refractive index of 1.533 (manufactured by Ticona GmbH, "TOPAS 6013"), and 4.6 parts by mass of a styrene elastomer (styrene-butadiene-ethylene block copolymer) having a mean particle diameter of 1 μm and a refractive index of 1.533 (styrene content in the styrene elastomer: 60% by mass) was fed into a T die, and subjected to extrusion molding to produce a test piece of Example 1 having an average thickness of 150 μm.

Examples 2 and 3

Test pieces of Examples 2 and 3 were produced in a similar manner to Example 1 except that the content of the styrene elastomer with respect to 100 parts by mass of the cycloolefin copolymer was as shown in Table 1.

Comparative Examples 1 to 3

Test pieces of Comparative Examples 1 to 3 were produced in a similar manner to Example 1 except that the content of the styrene elastomer with respect to 100 parts by mass of the cycloolefin copolymer was as shown in Table 1.

Haze Value

Haze value was measured by using "HZ-2" manufactured by Suga Test Instruments Co., Ltd., in accordance with JIS-K-7136: 2000. The results of the measurements are shown in Table 1.

Tensile Elongation

Tensile elongation was measured by using "TENSILON RTG-1210" manufactured by A&D Co. Ltd., in accordance with JIS-K-7161: 1994. The results of the measurements are shown in Table 1.

TABLE 1

|  | Content of elastomer with respect to 100 parts by mass of cycloolefin copolymer (parts by mass) | Haze value (%) | Tensile elongation (%) |
| --- | --- | --- | --- |
| Example 1 | 4.6 | not determined | 5.80 |
| Example 2 | 2.0 | 1.45 | not determined |
| Example 3 | 4.0 | 1.91 | 4.83 |
| Comparative Example 1 | 0.0 | 0.55 | 3.30 |
| Comparative Example 2 | 1.0 | 1.00 | not determined |
| Comparative Example 3 | 8.0 | 2.63 | 7.00 |

Relationship Between Haze Value and Tensile Elongation

Figure 9:
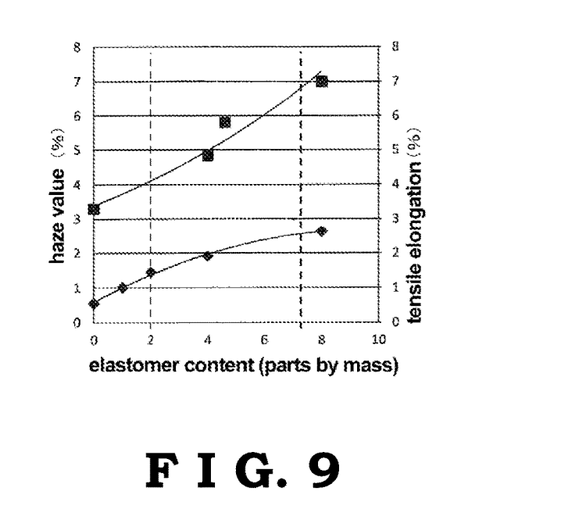
FIG. 9 shows a graph illustrating relationships of the content of a styrene elastomer with the haze value and the tensile elongation.

As shown in Table 1 and FIG. 9, it was proven that as the content of the styrene elastomer with respect to the cycloolefin copolymer increased, both the haze value and the tensile elongation increased. In addition, as shown in FIG. 9, when the content of the styrene elastomer with respect to 100 parts by mass of the cycloolefin copolymer is no less than 2 parts by mass, test piece was revealed to have superior tensile elongation of no less than 4%. Furthermore, as shown in FIG. 9, when the content of the styrene elastomer with respect to 100 parts by mass of the cycloolefin copolymer is no greater than 7 parts by mass, the haze value was revealed to be kept at a favorable level of no greater than about 2.5%.

Example 4

A substrate layer-forming material containing 100 parts by mass of a cycloolefin copolymer having a refractive index of 1.533 (manufactured by Ticona GmbH, "TOPAS 6013"), and 4.6 parts by mass of a styrene elastomer (styrene-butadiene-ethylene block copolymer) having a mean particle diameter of 1 μm and a refractive index of 1.533 (styrene content in the styrene elastomer: 60% by mass) was subjected to injection molding to produce a test piece having an average thickness of 2 mm.

Comparative Example 4

A cycloolefin copolymer having a refractive index of 1.533 (manufactured by Ticona GmbH, "TOPAS 6013") as a substrate layer-forming material was subjected to injection molding to produce a test piece having an average thickness of 2 mm.
Refractive Index
By using "KPR-2000" available from Shimadzu Device Corporation, refractive indices of the test pieces of Example 4 and Comparative Example 4 at each wavelength were measured. The measurement results of the refractive indices are shown in Tables 2 and 3. It is to be noted that each refractive index was an average value calculated with three times of the test.
Abbe Number
Based on the refractive indices determined by the procedure described above, Abbe numbers were calculated. The Abbe numbers are shown in Tables 2 and 3.

TABLE 2

|  | Temperature (° C.) | F-ray 486.1 nm | d-ray 587.6 nm | C-ray 656.3 nm | Abbe number |
|---|---|---|---|---|---|
| Example 4 | 23 | 1.54016 | 1.53329 | 1.53038 | 54.6 |
|  | 40 | 1.53847 | 1.53159 | 1.52886 | 55.3 |
|  | 60 | 1.53618 | 1.52929 | 1.52656 | 55.0 |
|  | 80 | 1.53355 | 1.52669 | 1.52396 | 54.9 |

TABLE 3

|  | Temperature (° C.) | F-ray 486.1 nm | d-ray 587.6 nm | C-ray 656.3 nm | Abbe number |
|---|---|---|---|---|---|
| Comparative Example 4 | 23 | 1.53981 | 1.53313 | 1.53029 | 56.1 |
|  | 40 | 1.53821 | 1.53163 | 1.52876 | 56.2 |
|  | 60 | 1.53631 | 1.52960 | 1.52691 | 56.3 |
|  | 80 | 1.53401 | 1.52733 | 1.52469 | 56.6 |

Wavelength and Temperature Dependency
As shown in Tables 2 and 3, it is seen that the difference in the refractive indices of the test pieces of Example 4 and Comparative Example 4 for the d-ray at 23° C., for example, was extremely small of 0.00016. In other words, it is revealed that the refractive indices of the test pieces scarcely changed due to the styrene elastomer contained. In addition, the difference in the refractive indices of the test pieces of Example 4 for the d-ray at 80° C. and 23° C., for example, was 0.0066, indicating extremely low temperature dependency. Furthermore, since the Abbe number of the test piece of Example 4 was smaller by only about 1.5 as compared with the Abbe number of the test piece of Comparative Example 4, it is proven that the test piece A exhibited a sufficiently small increase in the chromatic aberration.

Example 5

Figure 10:
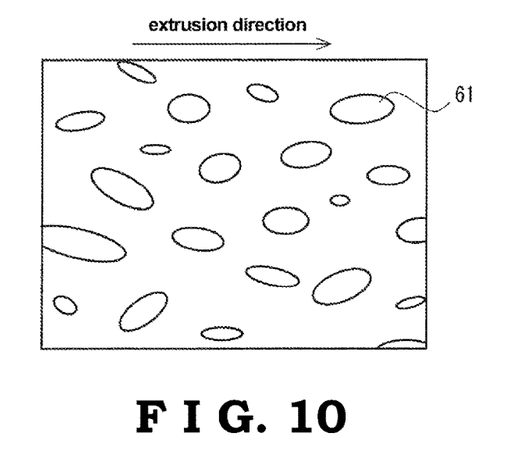
FIG. 10 shows a schematic view illustrating a shape of a styrene elastomer contained in a test piece of Example 4.

A substrate layer-forming material containing 100 parts by mass of a cycloolefin copolymer (manufactured by Ticona GmbH, "TOPAS 6013"), and 4.8 parts by mass of a styrene elastomer similar to that in Example 1 (styrene content in the styrene elastomer: 60% by mass) was fed into a T die, and subjected to extrusion molding to form a film having an average thickness of 150 μm. This film was cut away to produce a circularly looped test piece having a circumferential length of 3 cm and a width of 1 cm. It is to be noted that this test piece was produced such that the extrusion direction was in parallel with the circumferential direction. Further, this circularly looped test piece was obtained by pasting two ends along a longitudinal direction of a long film, with a double-stick tape (manufactured by Nichiban Co., Ltd. "NICETACK NW-F50"), providing an overlap length of 1 cm.
In addition, when the surface of the film after the extrusion molding was observed with a microscope, as shown in FIG. 10, the maximum diameter of the dispersed phases 61 each having an elongated particulate form oriented along the extrusion direction. Moreover, measurement on the dispersed phases 61 each having an elongated particulate form revealed the maximum diameter of around no less than 1 μm and no greater than 8 μm, and the maximum width of around no less than 1 μm and no greater than 5 μm.

Examples 6 and 7

A film having an average thickness of 150 μm was formed in a similar manner to Example 4 except that the content of the styrene elastomer with respect to 100 parts by mass of the cycloolefin copolymer was as shown in Table 4. This film was cut away similarly to Example 5 to produce a circularly looped test piece.

Comparative Example 5

A cycloolefin copolymer (manufactured by Ticona GmbH, "TOPAS 6013") was fed into a T die, and subjected to extrusion molding to form a film having an average thickness of 150 μm. This film was cut away to produce a circularly looped test piece having a circumferential length of 3 cm and a width of 1 cm. It is to be noted that this test piece was produced such that the extrusion direction was in parallel with the circumferential direction. Further, this circularly looped test piece was obtained by pasting two ends along a longitudinal direction of a long film, with a double-stick tape (manufactured by Nichiban Co., Ltd. "NICETACK NW-F50"), providing an overlap length of 1 cm.
Evaluations of Characteristics
Resistance Against Pressure
The circularly looped test pieces of Examples 5 to 7 and Comparative Example 5 were placed such that the radial direction thereof coincided with a vertical direction, and then a tabular weight was mounted at a height of 20 mm above the top of the test piece with an electromagnet. The weight was dropped by switching off the electricity. The presence or absence of the breakage of the circularly looped test piece was evaluated according to the following criteria:
A: breakage not found; and
B: breakage found.
The results are shown in Table 1.

TABLE 4

| | Content of elastomer with respect to 100 parts by mass of cycloolefin copolymer (parts by mass) | Mass of weight (g) | | |
|---|---|---|---|---|
| | | 50 | 100 | 150 |
| Example 5 | 4.8 | A | A | A |
| Example 6 | 2 | A | A | B |
| Example 7 | 7 | A | A | A |
| Comparative Example 5 | 0 | B | B | B |

As is clear from the results shown in Table 4, no breakage was observed on the test pieces of Examples 5 and 7 even when the weight of 150 g was dropped, suggesting superior resistance against pressure. In addition, no breakage was observed also on the test piece of Example 6 when the weight of 100 g was dropped, indicating having sufficient Resistance against pressure. To the contrary, breakage was observed on the test piece of Comparative Example 5 even when the weight of 50 g was dropped, indicating poor Resistance against pressure.

As described in the foregoing, since by virtue of being capable of easily and accurately conforming to a curved-face shape of the curved screen display, the sheet for an image display unit of the embodiment of the present invention is suited as a sheet to be provided on a front face side of a curved screen display. Moreover, the laminate for an image display unit and the image display unit of the other embodiments of the present invention are suited for a flat panel display enabling a suitable curved-face shape to be attained.

The invention claimed is:

1. A sheet for an image display unit to be provided on a front face side of an image display unit,
the sheet being configured to be received on front face side of an image display unit and comprising a substrate layer comprising a cycloolefin copolymer as a principal component, wherein
the substrate layer comprises an elastomer in an amount of no less than 2 parts by mass and no greater than 7 parts by mass with respect to 100 parts by mass of the cycloolefin copolymer,
a ratio of a refractive index of the cycloolefin copolymer to a refractive index of the elastomer is no less than 0.9 and no greater than 1.1,
the substrate layer comprises a sea-island structure comprising: a matrix phase comprising the cycloolefin copolymer as a main plymer; and a plurality of dispersed phases comprising the elastomer as main polymer,
at least a part of the dispersed phases are each in an elongated particulate form having a maximum diameter oriented along one direction on a plane of the sheet, wherein a maximum width along another direction on the plane which is perpendicular to the one direction of the maximum diameter is greater than a maximum thickness of the dispersed phases,
the substrate layer comprises on at least one face a wavy fine modulated structure, and
ridges of the wavy fine modulated structure are aligned along an orientation direction of the maximum diameter of the dispersed phases each in the elongated particulate form.

2. The sheet for an image display unit according to claim 1, wherein an average thickness of the substrate layer is no less than 100 μm and no greater than 500 μm.

3. The sheet for an image display unit according to claim 1, wherein a water absorbing rate of the substrate layer is no greater than 0.5%.

4. The sheet for an image display unit according to claim 1, wherein the substrate layer has a resistance against pressure of no less than 50 g as determined by a testing method comprising:
forming from the substrate layer a circularly looped test piece having a circumferential length of 3 cm and a width of 1 cm;
placing the circularly looped test piece such that a radial direction thereof coincides with a vertical direction; and
measuring a mass of a weight with which breakage occurs upon dropping of the weight from a height of 20 mm above a top of the circularly looped test piece.

5. The sheet for an image display unit according to claim 1, wherein a tensile strength of the substrate layer is no less than 40 MPa and no greater than 70 MPa.

6. The sheet for an image display unit according to claim 1, wherein a tensile elongation of the substrate layer in a longitudinal direction at 25° C. is no less than 4% and no greater than 15%.

7. The sheet for an image display unit according to claim 1, wherein a haze value of the substrate layer is no greater than 3%.

8. The sheet for an image display unit according to claim 1, wherein a ratio of number of the dispersed phases each in the elongated particulate form to number of the plurality of dispersed phases is no less than 1/10.

9. The sheet for an image display unit according to claim 1, wherein a moisture permeability of the substrate layer is no greater than 1 g/m²·24 h.

10. The sheet for an image display unit according to claim 1, further comprising an antireflection layer laminated on a front face side of the substrate layer.

11. The sheet for an image display unit according to claim 1, further comprising a transparent tacky material layer laminated on a back face side of the substrate layer.

12. The sheet for an image display unit according to claim 11, further comprising a release sheet laminated on a back face of the tacky material layer.

13. A laminate for an image display unit comprising:
the sheet for an image display unit according to claim 11; and
a liquid crystal panel on a front face of which the sheet for an image display unit is adhered to be laminated via the tacky material layer.

14. An image display unit comprising the sheet for an image display unit according to claim 1.

* * * * *

UNITED STATES PATENT AND TRADEMARK OFFICE
CERTIFICATE OF CORRECTION

PATENT NO.        : 10,315,396 B2
APPLICATION NO.   : 15/316035
DATED             : February 21, 2017
INVENTOR(S)       : Hironori Nakashima et al.

Page 1 of 1

It is certified that error appears in the above-identified patent and that said Letters Patent is hereby corrected as shown below:

In the Claims

Claim 1, Column 23, Line 44, should be corrected as follows:
From "...on front face..." to --...on a front face...--

Claim 1, Column 23, Line 57, should be corrected as follows:
From "...plymer..." to --...polymer...--

Claim 1, Column 23, Line 58, should be corrected as follows:
From "...as main polymer..." to --...as a main polymer...--

Signed and Sealed this
Tenth Day of September, 2019

Andrei Iancu
*Director of the United States Patent and Trademark Office*